(12) United States Patent
Hedley et al.

(10) Patent No.: US 12,514,445 B2
(45) Date of Patent: Jan. 6, 2026

(54) BODY WORN CAMERA, SENSOR AND CONTENT DELIVERY SYSTEM

(71) Applicant: HEADVANTAGE CORPORATION, Wilmington, DE (US)

(72) Inventors: Jay Hedley, Wilmington, DE (US); Peter Miller, Wilmington, DE (US)

(73) Assignee: HEADVANTAGE CORPORATION, Wilmington, DE (US)

( * ) Notice: Subject to any disclaimer, the term of this patent is extended or adjusted under 35 U.S.C. 154(b) by 0 days.

(21) Appl. No.: 18/187,570

(22) Filed: Mar. 21, 2023

(65) Prior Publication Data
US 2023/0293008 A1    Sep. 21, 2023

Related U.S. Application Data

(60) Provisional application No. 63/321,940, filed on Mar. 21, 2022.

(51) Int. Cl.
*A61B 3/14*     (2006.01)
*A61B 3/113*    (2006.01)
(Continued)

(52) U.S. Cl.
CPC .............. *A61B 3/145* (2013.01); *A61B 3/113* (2013.01); *A61B 5/0013* (2013.01); *A61B 5/163* (2017.08);
(Continued)

(58) Field of Classification Search
CPC ....... A61B 3/145; A61B 3/113; A61B 5/0013; A61B 5/163; A61B 5/721; A61B 5/6803; A61B 2503/10; G06T 11/00; H04N 7/183; H04N 23/57; H04N 23/6812; H04N 23/683

See application file for complete search history.

(56) References Cited

U.S. PATENT DOCUMENTS

2015/0046116 A1* 2/2015 Eatwell ................. G01L 5/0052
                                                            702/150
2018/0041707 A1* 2/2018 Beysserie ............ H04N 23/683
(Continued)

FOREIGN PATENT DOCUMENTS

EP           3699736 A1 *  8/2020  ............. A63F 13/00

OTHER PUBLICATIONS

Hirad et al. 2019 Sci. Adv. 5:eaau3460 11 pages (Year: 2019).*
(Continued)

*Primary Examiner* — Keith M Raymond
*Assistant Examiner* — Patrick M Mehl
(74) *Attorney, Agent, or Firm* — Oblon, McClelland, Maier & Neustadt, L.L.P.

(57) ABSTRACT

A streaming content delivery system is provided for processing and broadcasting digital video content obtained from a distributed wearable camera device having eye tracking and movement sensing circuitry, or combination of devices or components, worn by an athlete, sports participant, or first responder. The system which may include eye sensors, accelerometers, as well as other sensors and specific wearable devices are disclosed which provide sensor data-enhanced video content from the point of view of an athlete during competition including for the sports of football, baseball, golf, skiing, and snowboarding.

34 Claims, 9 Drawing Sheets

(51) Int. Cl.

| | |
|---|---|
| *A61B 5/00* | (2006.01) |
| *A61B 5/16* | (2006.01) |
| *G06T 11/00* | (2006.01) |
| *H04N 7/18* | (2006.01) |
| *H04N 23/57* | (2023.01) |
| *H04N 23/68* | (2023.01) |

(52) U.S. Cl.
CPC ............ *A61B 5/6803* (2013.01); *A61B 5/721* (2013.01); *G06T 11/00* (2013.01); *H04N 7/183* (2013.01); *H04N 23/57* (2023.01); *H04N 23/6812* (2023.01); *H04N 23/683* (2023.01); *A61B 2503/10* (2013.01)

(56) References Cited

U.S. PATENT DOCUMENTS

| | | | |
|---|---|---|---|
| 2018/0157045 A1* | 6/2018 | Davami | G02B 27/0172 |
| 2020/0128902 A1* | 4/2020 | Brown | A42B 3/042 |
| 2020/0187860 A1 | 6/2020 | Myslinski | |
| 2020/0214559 A1* | 7/2020 | Krueger | A61B 5/163 |
| 2020/0305708 A1* | 10/2020 | Krueger | G06F 3/013 |
| 2020/0329801 A1* | 10/2020 | Ciccaglione | A42B 3/22 |
| 2021/0149482 A1* | 5/2021 | Council | A61B 3/113 |
| 2021/0335483 A1* | 10/2021 | Freeman | G02B 21/0012 |
| 2022/0083134 A1* | 3/2022 | Kassner | G06F 3/013 |
| 2023/0072561 A1* | 3/2023 | Yoon | A63B 69/3608 |
| 2023/0223511 A1* | 7/2023 | Lee | H01M 10/4257 429/231.8 |

OTHER PUBLICATIONS

Iowa High School Athletic Association or IHSAA 2008, Helmet fitting 2018 1 page (Year: 2008).*
Cesqui et al. 2013 Journal of Vision 13(8):28 22 pages (Year: 2013).*
Ungurean et al. 2021 Current Biology 31:5370-5376 (Year: 2021).*
International Search Report and Written Opinion of the International Searching Authority issued Jun. 22, 2023, in PCT/US23/15822, filed Mar. 21, 2023, citing documents 1-4 and 15 therein, 8 pages.

* cited by examiner

BODY WORN CAMERA, SENSOR AND CONTENT DELIVERY SYSTEM

CROSS-REFERENCE TO RELATED APPLICATIONS

The present application claims priority to U.S. Provisional Application No. 63/321,940, filed Mar. 21, 2022, which is incorporated herein by reference in its entirety for all purposes.

BACKGROUND

Field of the Disclosure

The present disclosure relates to a wearable camera and sensor apparatus and content delivery system for data from the wearable camera and sensors.

Description of the Related Art

Sporting events are currently broadcast and recorded using multiple camera angles and using stationary and movable cameras at various locations in a sports stadium or other venue. However, currently, video content from the point of view of an athlete during professional competition is rarely available to be captured and broadcast.

A number of different standards are in use for the capture, transmission and broadcast of audio and video. Serial digital interface (SDI) is a family of digital video interfaces first standardized by the Society of Motion Picture and Television Engineers (SMPTE) in 1989. A related standard, known as high-definition serial digital interface (HD-SDI), is standardized in SMPTE 292M; this provides a nominal data rate of 1.485 Gbit/s.
Additional SDI standards have been introduced to support increasing video resolutions (HD, ultra-HD (UHD) and beyond), frame rates, stereoscopic (3D) video, and color depth. Dual link HD-SDI consists of a pair of SMPTE 292M links, standardized by SMPTE 372M in 1998; this provides a nominal 2.970 Gbit/s interface used in applications (such as digital cinema in a digital camera or HDTV 1080P) that require greater fidelity and resolution than standard HDTV can provide. 3G-SDI (standardized in SMPTE 424M) consists of a single 2.970 Gbit/s serial link that allows replacing dual link HD-SDI. 6G-SDI and 12G-SDI standards were published on Mar. 19, 2015.

The foregoing "Background" description is for the purpose of generally presenting the context of the disclosure. Work of the inventors, to the extent it is described in this background section, as well as aspects of the description which may not otherwise qualify as prior art at the time of filing, are neither expressly nor impliedly admitted as prior art against the present disclosure.

SUMMARY

The present disclosure relates to a content delivery system for processing, storing, and broadcasting digital video content and sensor data obtained from a wearable apparatus worn by an athlete, worker, or first responder.

The content delivery system includes an apparatus worn by a user, the apparatus including an embedded camera and sensors and circuitry configured to transmit video data captured by the embedded camera and sensor data over a wireless network; and processing circuitry configured to receive the video data captured by the embedded camera and the sensor data, store the video and sensor data for further processing, later rebroadcast, and/or use in related applications, convert the received video data into a broadcast format, combine the received video data with the sensor data, and transmit the converted video data to destination devices.

In one embodiment, the system comprises processing and broadcasting digital video content obtained from a wearable camera apparatus, the content delivery system including processing circuitry configured to receive digital video content captured by the wearable camera apparatus, convert the received digital video content into a digitally streamed or broadcast format, and in response to a request received from a destination device, transmit the digitally streamed or broadcast formatted data to the destination device. The wearable apparatus comprises a wearable structure, a battery; and circuitry, embedded in the wearable structure, and configured to transmit video data captured by the embedded camera over a wireless network wherein the camera, the battery, and the circuitry are integrally embedded in the wearable structure, the battery, the camera and the circuitry are of a small size, no more than 100 cubic centimeters combined. The wearable structure may include a football helmet, a snowsport helmet, a baseball cap, a baseball helmet or a helmet for a firefighter or police officer. It is also anticipated that a wearable structure may include a shoe, such as a golf shoe, on which a camera may be mounted which may track the path of a golf ball as it leaves the tee. The wearable structure may also include an eye-tracking sensor, a temperature sensor, a microphone as well as a battery strength indicator and a radio signal strength indicator. The non-transitory computer readable medium of the present disclosure includes instructions stored therein that, when executed by one or more processors, cause the one or more processors to perform a method of transmitting video and sensor data from a wearable apparatus, the method comprising: receiving video data captured by an embedded camera; receiving sensor data captured by one or more embedded sensors; converting the received video data and the received sensor data into a digital stream or a broadcast format; and transmitting the digital stream or broadcast formatted data to a destination device or devices.

According to an embodiment, the present disclosure further relates to a wearable apparatus which may, for example include one or more cameras, ideally located near the eyes of the wearer athlete and offering a similar field of view of the eyes, a microphone, a speaker, an eye movement, eye position, gaze point, and pupil size detector, an accelerometer, a gyroscope, a magnetometer (to determine direction with regard to the field of play e.g. a football field), a temperature sensor, a battery module, a GNSS system, status indicators such as LEDs or visual meters to give the status of the battery and/or status of a wireless connection, streaming status, SIM data, speed tests, local data storage status, as well as associated microprocessors and computer instructions to process the data, and one or more antennas to transmit and receive the data to and from the wearer of the device to at least one of a cloud server, on premise server or a mobile device such as a mobile phone or a tablet. Processing of the data within the apparatus may include encoding, compression and or encryption of the data stream(s) before it is wirelessly transmitted to a wireless transceiver. This may include, for example H.264 or H.265 compression. Signals transmitted to the transceiver(s) may also include the condition of the athlete themselves such as data from the accelerometer after a hard collision which may call for the wearer/athlete to be checked by a physician for a concussion. Health data may also include the temperature within the helmet, the dilation of the athlete's pupils, or another health indicator, which may be monitored by an inner facing camera or eye tracking sensor devices. This data may not only be stored on the device, but also calculated and streamed in near real time.

The foregoing paragraphs have been provided by way of general introduction and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
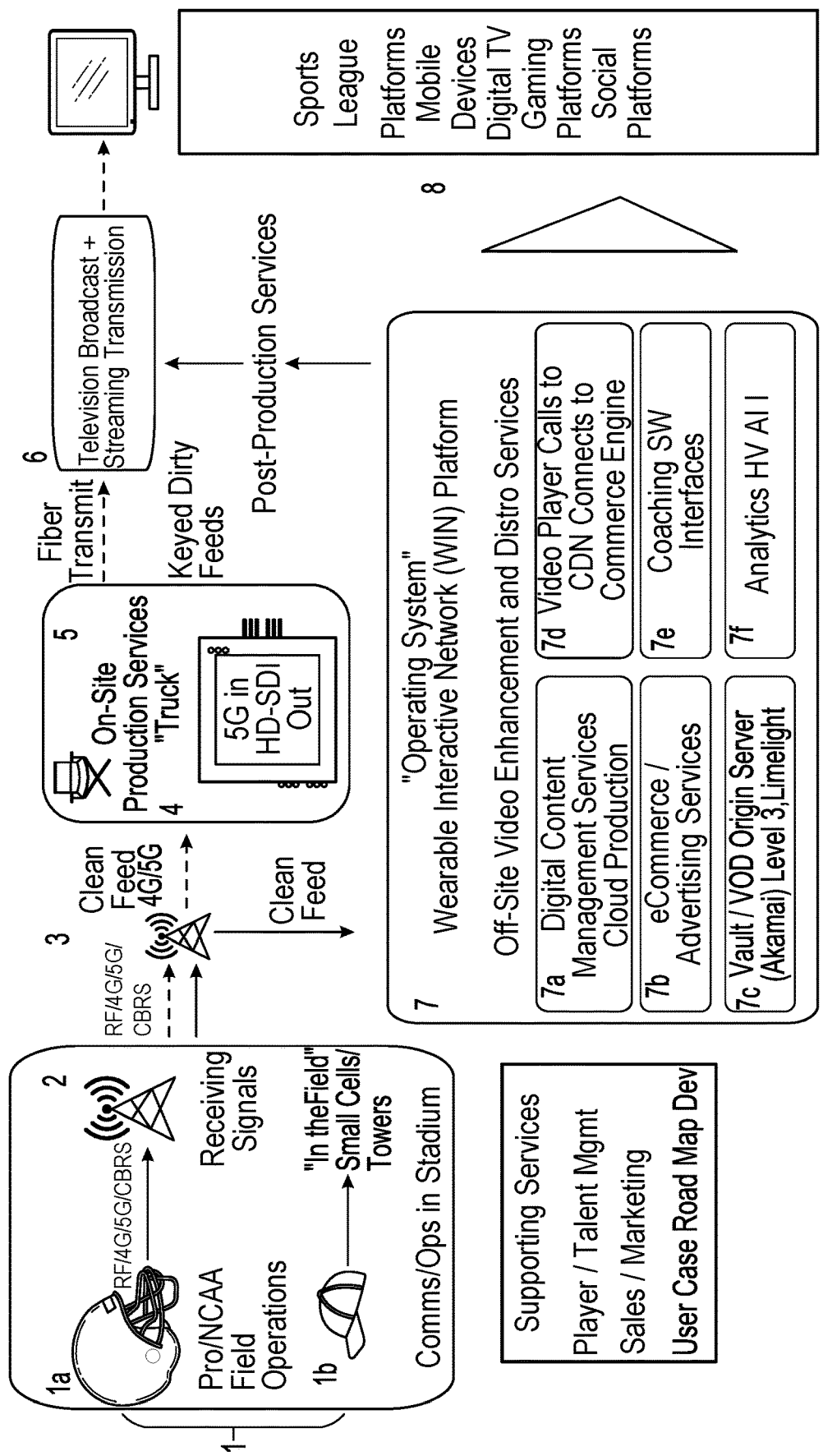
FIG. 1A illustrates a content delivery system for processing and broadcasting digital video content obtained from a wearable camera apparatus worn by a person according to one embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The exemplary embodiments are described in the context of methods having certain steps. However, the methods and compositions operate effectively with additional steps and steps in different orders that are not inconsistent with the exemplary embodiments. Thus, the present disclosure is not intended to be limited to the embodiments shown but is to be accorded the widest scope consistent with the principles and features described herein and as limited only by the appended claims.

Furthermore, where a range of values is provided, it is to be understood that each intervening value between an upper and lower limit of the range—and any other stated or intervening value in that stated range—is encompassed within the disclosure. Where the stated range includes upper and lower limits, ranges excluding either of those limits are also included. Unless expressly stated, the terms used herein are intended to have the plain and ordinary meaning as understood by those of ordinary skill in the art. Any definitions are intended to aid the reader in understanding the present disclosure but are not intended to vary or otherwise limit the meaning of such terms unless specifically indicated.

In one embodiment of the present disclosure there is provided a wearable apparatus included an image sensor, such as a camera, to capture and stream digital still images and/or digital video images providing a partial or full field of view of, for example, an athlete wearing the apparatus. The image sensor can be embedded in or attached to the wearable apparatus. The images captured by the camera can represent what the athlete sees while wearing the apparatus. In one example, the apparatus is a football helmet, in which a camera and associated hardware are embedded, that can be worn by, for example, a football player while playing football. In another example, the apparatus is a cap worn by an athlete, a cricket helmet, or a baseball helmet worn while playing baseball. However, the wearable apparatus of the present disclosure is not limited to football and baseball apparel and the camera and associated electronics described herein can be embedded in other wearable items.

In one embodiment, the apparatus includes computer hardware configured to stream high-definition, full high-definition, and ultra-high-definition (720p, 1080p, 2K, 4K, etc.) images and sensor data over Wi-Fi, Long Term Evolution (LTE), 5G, Citizens Broadband Radio Service (CBRS) or other transmission bands, technologies, or protocols, including radiofrequency (RF) transmissions or a private channel. Further, as described in more detail herein, the wearable apparatus is connected to a Wearable Interactive Network (WIN) platform for capturing, enhancing, distributing, and monetizing content received from one or more of the apparatuses. The content can include video/image data as well as sensor data. For example, not only will viewers be able to view the content from various athletes, but the recorded content can also be used by coaches to evaluate and improve the performance of players. Moreover, in conjunction with data collected by other sensors, such as an accelerometer, the received video content can be used to improve player health and safety, e.g., by improving concussion protocols and more easily identifying events that could have caused a concussion.

In particular, the apparatus can be a helmet and can include a compass, gyroscope, accelerometer, magnetometer, other motion sensors, and eye-tracking sensors to measure the pupil diameter, rate of diameter changes and convergence or divergence of the eyes of the wearer of the apparatus. In one example, the accelerometer can be a three-axis accelerometer and the gyroscope can be a three-axis gyroscope. The sensors can capture data in nine degrees of freedom, more than nine degrees of freedom, or fewer than nine degrees of freedom. Thus, in one embodiment, data from the accelerometer and gyroscope is used to determine the force and direction of a physical impact on the helmet when worn by an athlete, which can affect the athlete, e.g., cause a rate of change of the pupil diameters, as measured by the eye-tracking sensors. In one embodiment, for impacts measured by the accelerometer above a predetermined number, for example, for impacts above 50G or appropriate threshold, the eye-tracking sensor can be programmed to automatically check the eyes to look for issues (such as crossed eyes or changes in pupil diameter) and send a signal to a device on the sideline which may be monitored by a physician or other health professional. The signal can include relevant medical data (eye-tracking sensor data) and impact data collected by the helmet sensors. The signal can include a temporal mapping or comparison of the impact data and the eye-tracking data. For example, the signal can include a timeline wherein an impact vector (magnitude and direction of impact) is depicted. Depending on the sensor data and/or the physician evaluation, the player can then be removed from the competition. The collision data as well as the eye tracking data can be stored in a server or stored in the cloud for later reference.

In one embodiment of the present disclosure, FIG. 1A illustrates a content delivery system for processing and broadcasting digital video content and sensor data obtained from a wearable apparatus worn by a person (athlete). In particular, as illustrated in FIG. 1, a wearable device 1, such as a football helmet 1a and a baseball cap 1b or batting helmet, includes one or more cameras that capture video content that is uploaded via Radio Frequency wireless communication networks (e.g., Citizens Broadband Radio Service (CBRS) and/or 4G/5G cellular networks and/or Wi-Fi) to a device 2 in a stadium or playing field environment. The wearable device 1 can further include one or more sensors, as has been described herein, configured to capture sensor data that is similarly uploaded over a communication network to the device 2 in the stadium or playing field environment. Generally, the device 2 can be a "local" device, such as a transceiver or a server, at the same location, within the same environment, or in a certain proximity to the wearable device 1, according to some embodiments. In one embodiment, the device 2 can be a device that is accessed by the wearable device 1 via a local network or communication protocol, such as Bluetooth. The device 2 can process the video content and the sensor data for various downstream destinations or processes. For example, the device 2 can combine the video content and the sensor data, synchronize the video content and the sensor data, separate the video content and the sensor data, convert a format of the video content and/or the sensor data, or otherwise process the video content and/or the sensor data. In one embodiment, the device 2 can prepare the video content and the sensor data for television broadcast. The digital video or audio content is then transferred to an on-site production facility 5 via, e.g., a cellular network 3, a direct wired connection to the in-stadium device 2, or other appropriate protocol for streaming video data. In some embodiments, the video content and/or the sensor data can be transmitted to a cloud-enabled or other remote device (e.g., a server) at a separate physical location.

Figure 6:
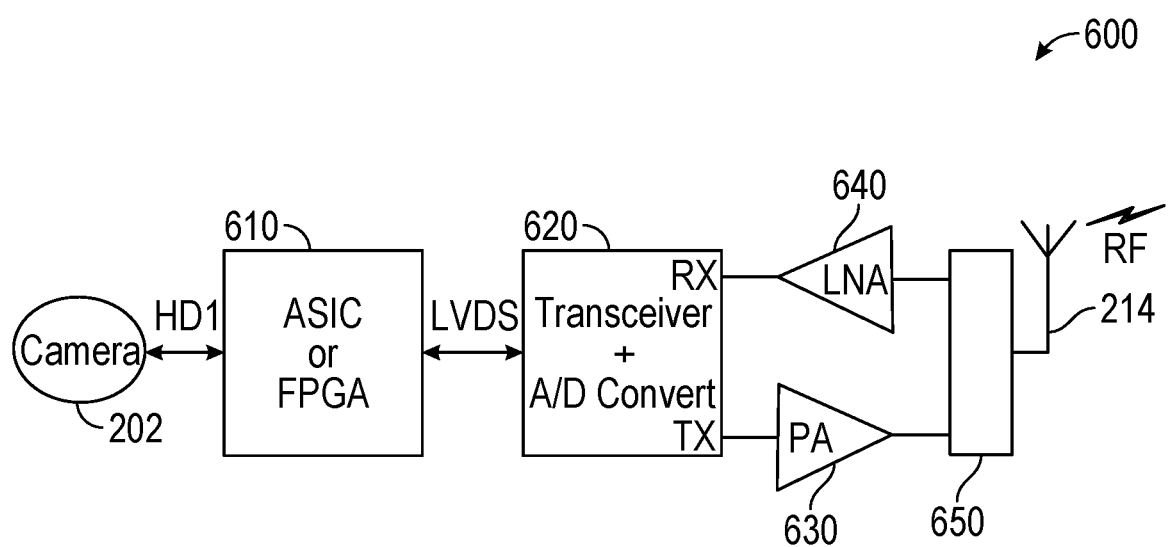
FIG. 6 illustrates a simplified hardware diagram performing of Radio Frequency (RF) to SDI conversion according to one embodiment of the present disclosure.

In one embodiment, in the on-site production facility, incoming signals carrying digital video content and/or sensor data (e.g., in real time messaging protocol (RTMP), real time streaming protocol (RTSP), real time communication (RTC) or WebRTC format, or other data protocols and formats) can be transmitted in a format suitable for further rendering or transmission, e.g., broadcasting. The format can be a native format or format for wireless transmission protocols that can later be converted for display. In one embodiment, the digital video content and/or sensor data can be directly converted (4) to a format such as a high-definition serial digital interface format (such as HD-SDI). FIG. 6 illustrates the SDI to Radio Frequency conversion. In one embodiment, the sensor data can be used to modify the digital video content or generate new digital content, e.g., digital video content. The converted video content is then transmitted to a television broadcast facility 6 for broadcast to television viewers. In one embodiment, all signals, data, audio, and video are streamed to a digital platform where all data may be enhanced, encrypted, modified, stabilized, noise reduced, color-corrected, separated, etc. before it is transmitted to another party such as a broadcaster or another third party platform.

In another embodiment, the video content and/or sensor data is also separately transferred (via a cellular transmission, for example) to one or more cloud servers or devices implementing the wearable interactive network (WIN) platform 7. The WIN platform 7 provides various off-site video content enhancement and distribution services, described in more detail below.

The WIN platform includes a digital content management (cloud production) services 7a, e-commerce/advertising services 7b, video-on-demand (VOD) services 7c, content delivery network (CDN) services 7d, coaching software interfaces 7e, and analytics and artificial intelligence (AI) services including denoising 7f. Data generated on the WIN platform 7 can be accessed (8) through various well-known league platforms, gaming platforms, and social platforms via mobile devices, computing devices, and digital televisions.

The cloud production services component 7a can include data processing, combining data, storing, editing, and streaming the captured digital video content to various consumption platforms and user devices. The e-commerce/advertising services component 7b can include, e.g., marketing application programming interfaces (APIs) for various commercial platforms and content channels, to enable one-to-one intelligent digital advertising, for example. Further, the WIN platform can implement payment authorization and collection for users receiving the captured digital video content.

In addition, the WIN platform component 7d can handle video player calls for content delivery. Various other APIs can be used for enhanced immersion and data synthesis, as well as health and safety data correlation and alerting (e.g., as part of a concussion protocol), as well as embedded transactions into the content. This can include transparent computing or other such immersive technologies such as virtual reality (VR) or augmented reality using a VR headset or using one screen techniques.

Figure 1B:
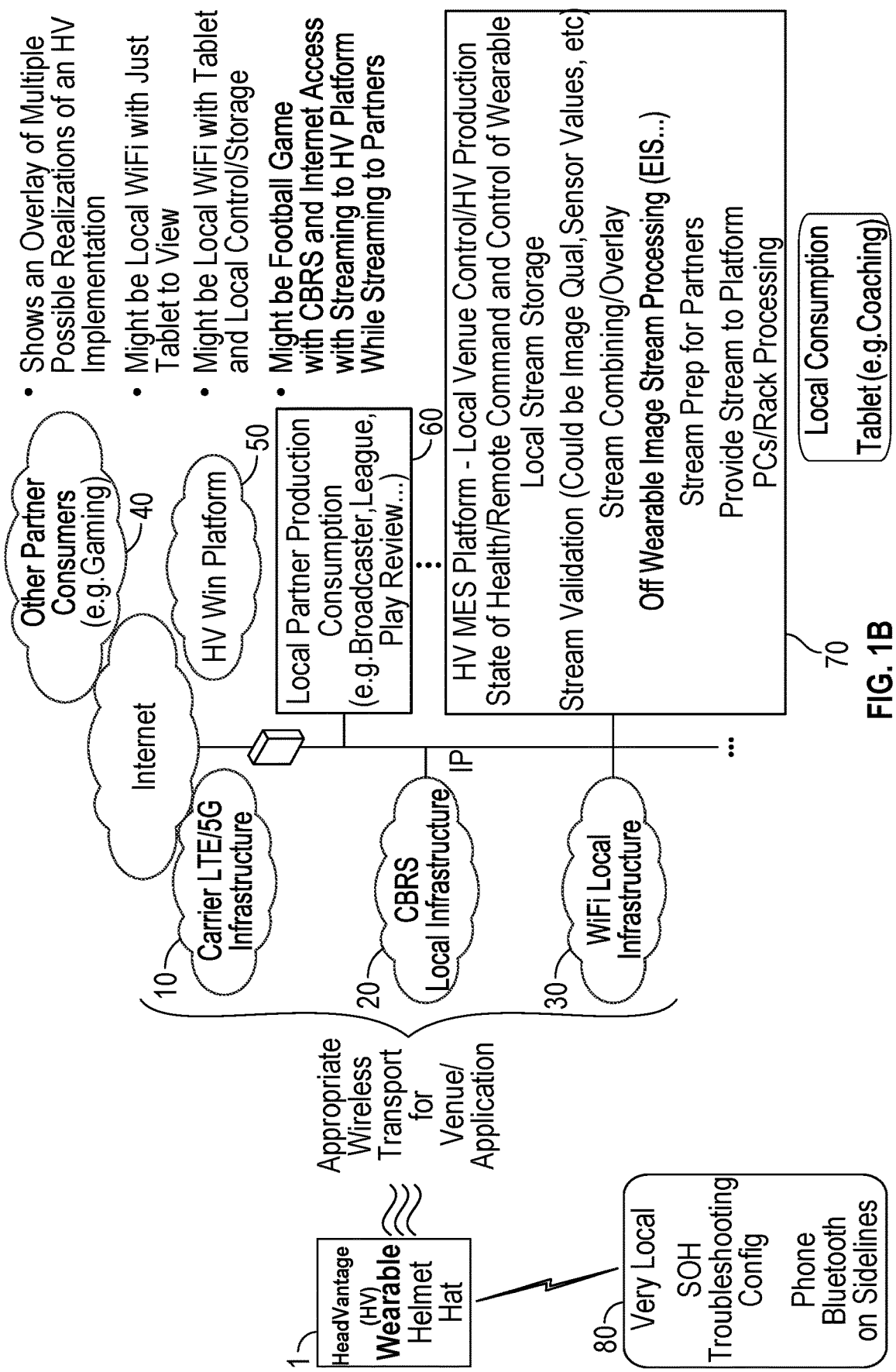
FIG. 1B illustrates a more detailed view of portions of the content delivery system of FIG. 1A according to one embodiment.

FIG. 1B illustrates a more detailed view of the content delivery system shown in FIG. 1A. In particular, the wearable helmet or hat 1 is configured to stream images and other data via one or more wireless networks, including a 4G LTE or 5G network 10, a local Citizens Broadband Radio Service (CBRS) network 20, or a local Wi-Fi network 30 which may use standard frequencies, including, but not limited to, 2.4 Gigahertz (GHz), 5 GHZ, 6 GHZ, etc. In some embodiments, the wearable helmet 1 is configured to stream data over frequencies with transmission at low power and using tilted antennas known to reduce interference. Using the local networks 20 and 30, for example, the streaming data from the wearable 1 can be transmitted to the WIN platform, a local production partner, such as a broadcaster facility on site, and/or to a production server 70. The production server is configured to locally process the streaming data, by performing various functions, including locally storing the received data, stream validation, combining/overlaying different streams, processing the stream for sending to production partners via network 40, providing the stream to the wearable interactive platform (WIN) 7 of FIG. 1A via network 50, performing electronic image stabilization (EIS) processing on the received images, and performing remote command and control of the wearable helmet/hat 1.

In one embodiment, the wearable can also communicate/stream data to a local device, such as a tablet device or a mobile phone on the sidelines of a football field, for example, via a wireless protocol to perform configuration, calibration, and/or troubleshooting. The local device can similarly process the data from the wearable, e.g., by performing EIS on the received image or video data.

Figure 2:
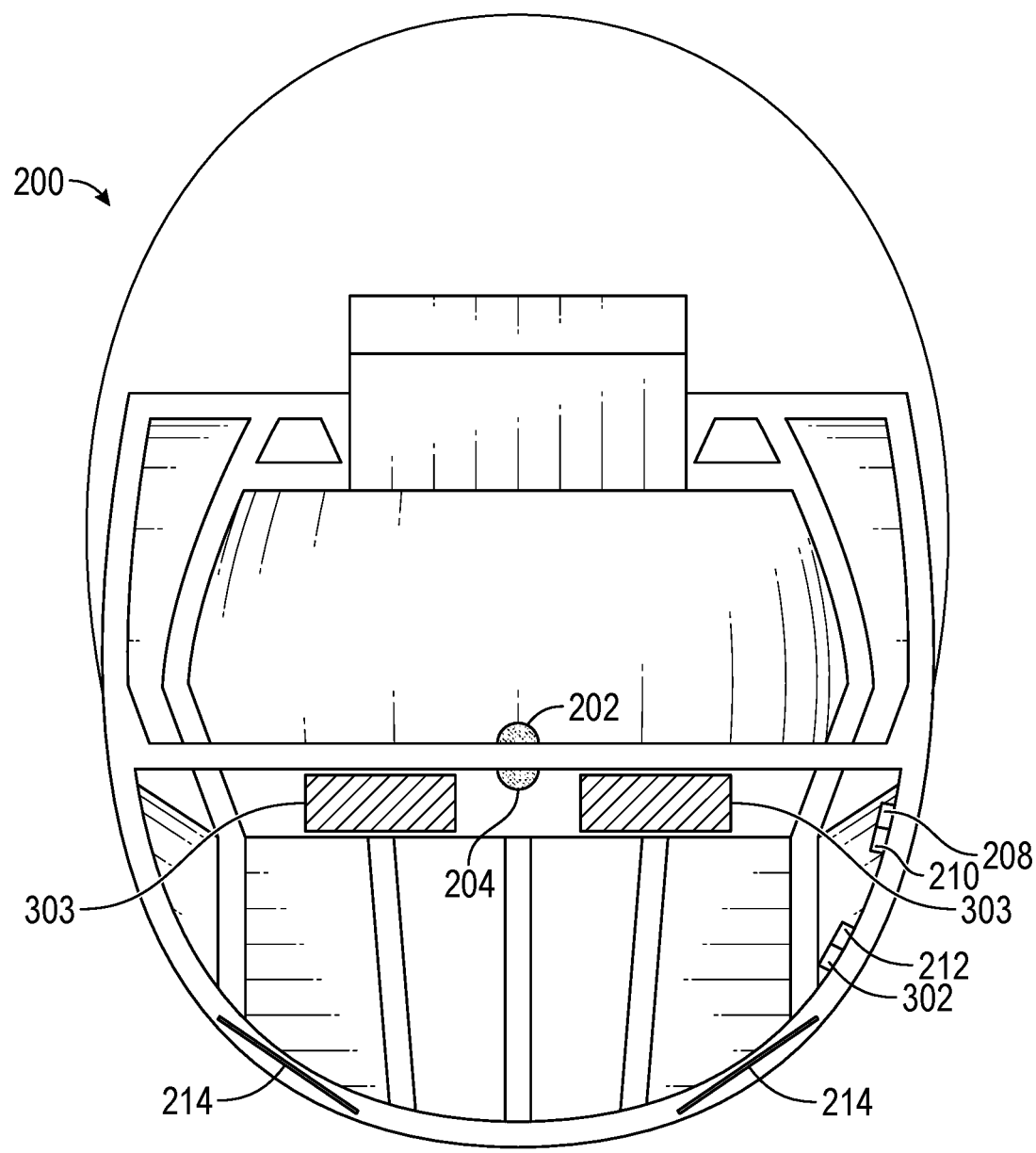
FIG. 2 illustrates a football helmet with an integrated camera, eye-tracking sensors, and associated electronics to transmit video content captured by the camera according to one embodiment of the present disclosure.

FIG. 2 illustrates a wearer's view of a football helmet 200 with an integrated outward facing camera 202, an inward facing camera 204, and one or more eye-tracking sensors 303. In particular, as shown in FIG. 2, a pair of infrared (IR) illuminators, cameras, electrical sensors, and/or other sensors 303 are integrated into a portion of the faceguard of the helmet, e.g., at a distance between 4 and 8 inches from the eyes of the wearer of the helmet or at a distance between 3 to 10 inches from the eyes of the wearer. The distance between the eye-tracking sensors 303 and the eyes may be greater than 10 inches or less than 3 inches, in some embodiments. The eye-tracking sensors 303 may capture data associated with components of the eye, such as the cornea, the pupil, blood vessels, etc. In one embodiment, the eye-tracking sensors 303 may capture reflections off of the eye. The eye-tracking sensors 303 can determine where the wearer is looking (a gaze point) or a focus of the wearer's eyes. The gaze point can be defined as a record of where the wearer's right or left eye is looking at a point in time. The frequency at which a gaze point is collected and recorded can vary. In some embodiments, the eye-tracking sensors 303 can determine a pupil diameter or dilation, as well as ophthalmic issues such as whether the wearer is cross-eyed or experiencing uncontrolled eye movement.

Also shown is an indicator 208 to indicate the status of the network connection to either of the networks 10, 20, or 30, an indicator 210 to indicate the status of the battery. These indicators 208, 210 may be audible or optical, e.g., a light-emitting diode (LED). The indicators 208, 210 may include a Radio Strength Status indicator to show the strength of the network connection or may indicate the strength of the associated battery, or be a local data storage indicator. Also illustrated is an optional speaker 212, and a microphone 302 which would enable 2-way voice communication with the wearer of the device. In the design of the helmet, the cameras are positioned so as not to interfere with any face shield that is worn with the helmet. Also shown built-in to the facemask are two or multiple diversity antennas 214. Associated electronics including a memory, a CPU, any required Field Programmable Gate Arrays (FPGA) or Application Specific Integrated Circuits (ASICs) and one or more wireless transceiver integrated circuits are incorporated into the helmet. These associated electronics, as well as the indicators 208, 210 and antennas 214 may be located elsewhere in the helmet, or in one embodiment, worn by the wearer at a different part of the body, such as, for example on a belt clip connected via wires or connected wirelessly to the one or more helmet cameras. The antennas 214 may then transmit video content and data captured by the cameras and sensors according to this embodiment of the present disclosure. As described below with respect to FIG. 3, the helmet may include an integrated CPU (or other processing circuitry) and one or more wireless communication interfaces for wirelessly transmitting (via captured digital video data and telemetry from the helmet to an outside device, e.g., a device in a stadium or playing field environment).

Figure 3:
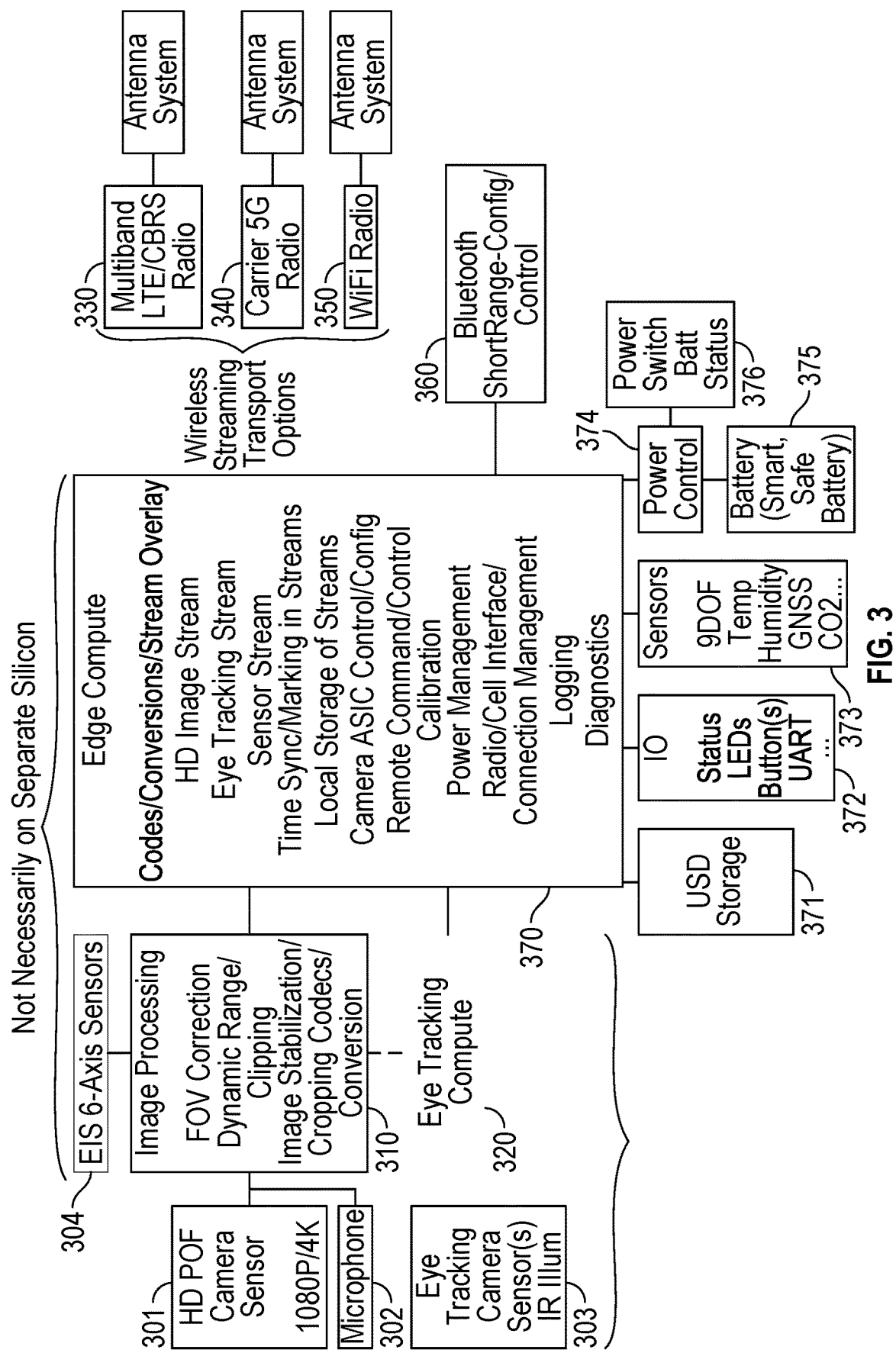
FIG. 3 is a system architecture including the camera, eye-tracking sensors, and the associated electronics integrated into a helmet, e.g., the helmet shown in FIG. 2 according to one embodiment of the present disclosure.

In particular, as shown in FIG. 3, the hardware elements of the football helmet (or other wearable item, such as a hat, headgear, headband, or helmet) can include a HD, Full-HD, UHD 720p/1080p/4K (8K/12K) camera 301 (with firmware providing the ability to run video at 4K at 60 FPS+), a microphone 302, one or more eye-tracking sensors (e.g., IR sensors) 303, motion sensors 304, image processing circuitry 310, and eye-tracking circuitry 320. The eye-tracking sensor may collect information on the amount of time the eyes of the wearer spend looking in one direction, or they may collect information on pupil dilation.

The temperature sensor permits sensing of heat within the helmet and may allow for turning on or off some or all of the electronics, including the camera remotely or, in combination with a command from the wearer input via the embedded microphone 302.

The cameras may be neuromorphic or event cameras as described in H. Sarmadi, R. Muñoz-Salinas, M. A. Olivares-Mendez and R. Medina-Carnicer, "Detection of Binary Square Fiducial Markers Using an Event Camera," in IEEE Access, vol. 9, pp. 27813-27826, 2021, doi: 10.1109/ACCESS.2021.3058423 (incorporated herein by reference). The camera 301 can be a power over fiber (POF) camera with fiber connectivity between the camera and the electronics module 450. In one embodiment, the helmet includes a pair of integrated IR sensors 303 to track the eyes of the wearer of the headgear (e.g., a hat, helmet, or headband), as shown in more detail in FIG. 4.

The motion sensor 304 includes a 3-axis gyroscope and a 3-axis accelerometer, whose measurements may be used for electronic image stabilization (EIS), described below or used to detect impact to an athlete's head while wearing the headgear.

The image processing circuitry 310 is circuitry configured to perform field-of-view (FOV) correction, dynamic range expansion processing/clipping, electronic image stabilization, and/or image cropping using information from the motion sensors 304, and image coding/conversion/compression of images obtained from the camera 301. Note that the image processing circuitry 310 may be incorporated into any of the described wearables or on a digital platform such as WIN.

The image stabilization may be performed on the image processing circuitry 310 in full or in part. In an embodiment wherein EIS is partially performed by the image processing circuitry 310, the remaining stabilization and processing can be performed on another device, such as a server. The server can be on premises, e.g., within a proximity to the wearable device. For example, the wearable device 1 being used in a stadium can transmit video data and sensor data over a wireless communication network to a server at the stadium. The server can stabilize the video data and process the video data and sensor data in real time or near-real time. The server can transmit the stabilized and processed data to a third device, a platform, or another server for further distribution. The server can also store data, copy data, and process data for various downstream applications and processes. The proximity of the server to the wearable device 1 can reduce latency and enable continuous processing of data being collected by the wearable device 1 in real time. The image stabilization may operate by obtaining a greater portion of the image a cropping the image as needed. Furthermore, artificial intelligence may be used to fill in certain portions of the image that are missing based on images taken by other cameras in the stadium or on other players helmets. This mesh network of imaging may keep track of all the positions of the players and fixed or moving cameras in the stadium in real time and will use this information to substitute or enhance the images from a player's image stream when excessive movement or change in the image is detected. Sensor data from the motion sensors can be used in stabilizing the images by providing data on the motion of the wearable device 1 and the attached cameras when the images were captured. In addition, accelerometer data and metadata may be passed along with the video or image data from the image processing circuitry 310 to provide the server with information about what stabilization has taken place to the image by the image processing circuitry 310 on the wearable device itself. The metadata can indicate the extent to which images have been stabilized on the wearable device itself. This information can improve the efficiency of subsequent image stabilization and reduce redundant or countereffective processing.

Further, the wearable camera apparatus can include various wireless streaming elements (720p, 1080p and 4K|60 FPS+), including a multiband LTE/CBRS radio transmitter/receiver 330, a 5G radio transmitter/receiver 340, a Wi-Fi radio transmitter/receiver 350, a Bluetooth® transmitter/receiver 360, and similar wireless data transmission systems, as well as associated antennas.

As shown in FIG. 3, the image processing circuitry 310 and the eye-tracking circuitry 320 are connected to processing circuitry built into the wearable camera apparatus and provide image data and eye-tracking information to the processing circuitry. Further, the processing circuitry is connected to a memory storage device 371, various I/O devices 372 (such as status LEDs, input buttons, etc.), various sensors 373, such as temperature, humidity, location motion sensors, etc.), and a power controller 374. As an example, the location sensors can be configured for any satellites, constellation systems, or subsystems of the global navigation satellite system (GNSS), including, but not limited to, the Global Positioning System (GPS), Galileo, Beidou, GLONASS, etc. The power controller 374 is connected to a battery 375 and a power switch and/or power status indicator 376.

The processing circuitry is configured to perform a variety of functions, including, e.g., executing CODECs/conversions/stream overlay for images, providing an HD image stream, providing an eye-tracking stream of eye-tracking data, providing a sensor data stream, providing time-sync/marking for various streams, local storage of data and video streams, controlling and configuring the camera and eye-tracking sensors, processing remote commands, performing calibration, performing power management, radio/cell/connection management, error/data logging, and diagnostics.

In one embodiment, the eye-tracking data can be integrated into the video data during image stabilization of the video data. The eye-tracking stream can indicate the gaze of the wearer, while the stream of video data captures approximately the field of view of the wearer. Thus, the eye-tracking data can be mapped or plotted onto the video data to indicate where the wearer is looking within each frame of video data. In one embodiment, the mapping of the eye-tracking data onto the video data can include a synchronization of the eye-tracking stream and the stream of video data in time. The synchronization can include, for example, timestamping the streams individually or as a combined stream. In one embodiment, the mapping of the eye-tracking data onto the video data can include modifying the video data or generating new video data indicating the gaze point of the wearer. For example, a frame of video data can encompass a portion of the wearer's field of view. The place where the wearer is actually looking within the wearer's field of view can be determined using the eye-tracking data and can be visually indicated or plotted on the corresponding frame of video data. The visual indicator can include, for example, a graphic enclosing the gaze point of the wearer or a modification of the video data to emphasize or highlight the region of the gaze point. The visual indicator can move to track the wearer's gaze as the wearer's head (e.g., field of view) moves and as the wearer's eyes move. In one embodiment, movement of the head can be accurately tracked using the video data and/or the sensor data even if the eye does not move. In one example, a loose-fitting helmet will move around on the head of a wearer when the wearer is running. The image stabilization and mapping of eye-tracking data can account for the movement of the helmet based on the movement of the head and/or the eyes relative to sensors in the helmet. The movement of the head and/or the eyes relative to the sensors, as opposed to where the eye is pointing or the pupil dilation, can provide information about the movement of the head or helmet. In one embodiment, the visual indicator can include a trail or a trajectory of the wearer's gaze in the past.

In some embodiments, a device as disclosed herein can track and map the gaze point of the wearer while stabilizing the video data. Notably, in some embodiments, the gaze of the wearer can be indicated on the video even after the video has been rotated, cropped, or otherwise modified during EIS, e.g., by rotating a cropped portion. The eye-tracking data can still be accurately coupled to the video data even when the dimensions or other properties of the video data are modified significantly for purposes of stabilization or general improvement of image quality. In one embodiment, the eye-tracking data can be plotted onto the video data during EIS. The live plotting of the eye-tracking data can compensate for rotations and similar stabilization processing. The time synchronization of the eye-tracking stream with the video data and additional sensor data streams can enable the accurate plotting of the eye-tracking data. In one embodiment, the eye-tracking stream can be synchronized in time with sensor data streams, such as motion sensor data streams (e.g., gyroscope data). The motion sensor data can be used to determine how to map the eye-tracking data onto the video data during image stabilization, since the motion sensor data is also used during EIS.

As described above, the image stabilization and plotting of the eye-tracking data can be performed by the image processing circuitry 310 of the wearable device. According to some embodiments, the image stabilization and plotting of eye-tracking data can be distributed across one or more devices. It can be appreciated that the steps attributed to the image processing circuitry 310 of the wearable device herein can similarly be attributed to image processing circuitry of a second device, such as a server, a computer, a mobile device, etc. For example, the image processing circuitry 310 of the wearable device can perform one or more initial steps of image stabilization, and the remaining steps of image stabilization and the inclusion of the eye-tracking data can be performed by a second device, such as a local server in the same physical environment as the wearable device. In one example, a device that performs any portion of EIS can generate metadata related to the EIS that was performed. For example, the metadata can include a degree of image stabilization, data that was used for image stabilization, synchronization data, a reporting of modifications made to the video data, and additional quantitative or qualitative descriptors of stabilization. The metadata can be transmitted along with the video data and any accompanying sensor data, including the eye-tracking data, to a next device. The next device can use the metadata to determine a next step of image stabilization that builds off of the previously performed stabilization. The distribution of image stabilization using metadata can also be useful when EIS is performed asynchronously. For example, video data and sensor data can be captured and stored for broadcast at a later time. The metadata can be used by any device that stores or retrieves the video data at a later time to continue stabilization of the video data.

In some embodiments, the field of view captured by the camera of a wearable device can be limited in range or angle compared to the full field of view of a wearer of the wearable device. Humans may have a wider field of view than can be achieved by the camera that is attached to a wearable apparatus. Therefore, it is possible that the gaze point of a wearer falls outside of the bounds of a video captured by the camera after image stabilization. The image processing circuitry 310 of the wearable device can still determine a gaze point of the wearer. In one embodiment, the location of the gaze point can be determined relative to coordinates or a fixed point that is not dependent on the video data. In one embodiment, the visual indicator as described above can indicate that the gaze point is outside of a frame of video data. For example, the visual indicator can be an arrow at the edge of the frame of video data pointing in the direction of the gaze point outside of the frame. The visual indicator can transform from a typical indicator to the arrow once the gaze point reaches and surpasses the edge of the frame. The visual indicator (e.g., arrow) may be accompanied by a number of degrees corresponding to where the eye is looking. The number of degrees can be, for example, from the edge of the field of view of the video or off of the center of the frame. In one embodiment, the visual indicator can include a distance between the gaze point and the bounds of the frame of video data or another landmark such as the center of the frame. The visual indication that the gaze point is outside of the field of view of the camera can still provide useful information about the wearer of the wearable device and their surroundings.

In one embodiment, feedback related to the eye-tracking stream may be given to the wearer, such as a display within the helmet. This may be visible feedback, such as a changing color of an LED or a heads-up display to indicate feedback to the wearer. For example, the feedback can indicate that too much time is spent looking in one direction, such as when a quarterback spends more than a configurable amount of time looking at a single receiver, which may "telegraph" the quarterback's intentions to the defensive players. In one embodiment, the display may show a trail of movements of other players to help a viewer view movements more easily. In one embodiment, the headgear includes a reticle and the reticle, and any symbology generated by any sensor on the wearable, can change shape or color or flash based on time or any other programmed parameter (e.g., duration of a saccade or focus duration on a coordinate).

Figure 4:
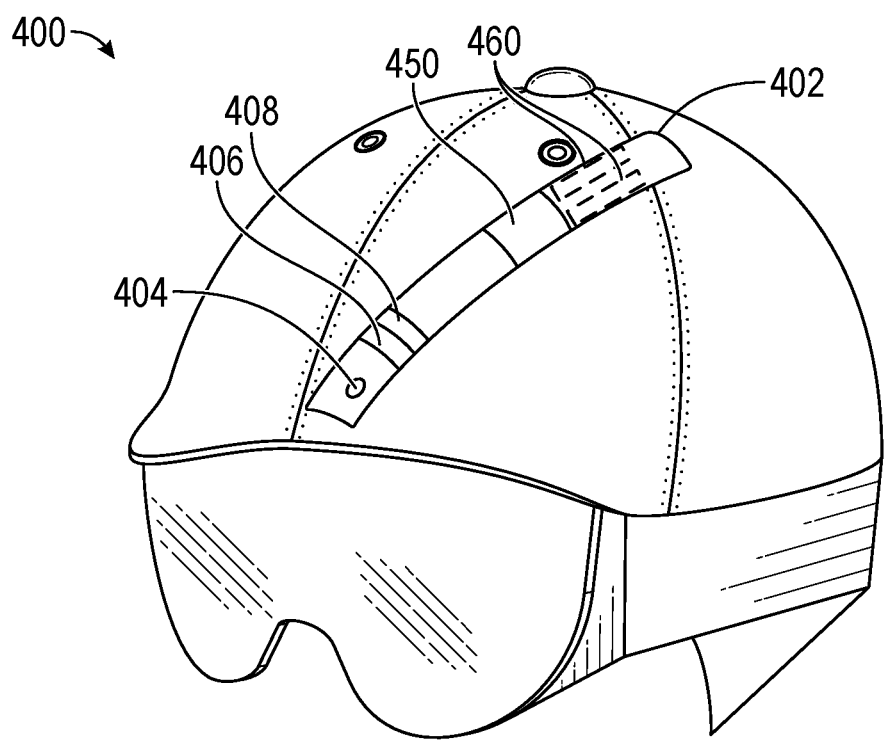
FIG. 4 illustrates a snowsport helmet with an integrated camera and associated electronics to transmit video content captured by the camera according to one embodiment of the present disclosure.

FIG. 4 illustrates a snowsport helmet 400 with an integrated camera 404 and associated electronics 450 to transmit video content and data captured by the camera according to one embodiment of the present disclosure. According to this embodiment, a snow sport helmet 400 that may be worn for downhill skiing or snowboarding, a camera 404 may be integrated into a flexible or molded strip 402. The strip 402 may be mounted by a VELCRO® brand fastener or another detachable connector to the exterior of the helmet 400. The strip 402 may be H inch in height or a similar dimension and will travel over the top of the helmet. The strip 402 may also have a greater height or a smaller height in some portions depending on the fashion portions added to the top. For instance, faux hair could be added to the strip 402 and an antenna element could be embedded therein. The strip 402 may also include indicators to indicate the network connection status 406 and/or the battery status 408. As illustrated in FIG. 4, integrated into the strip 402 (or into the back of the helmet) is an electronics module 450 which contains the battery and the necessary integrated circuits for transmission of the video to the network. In one embodiment, the electronics module 450 is less than 100 cubic centimeters. The electronic module 450 may be around 100 cubic centimeters or larger than 100 cubic centimeters. In one embodiment, the wearer may enable or disable the video transmission or the electronics module 450 via toggle switch or via voice command in order to maintain privacy in the locker room or to control the temperature of the helmet. In one embodiment, the video capabilities and/or the electronics module 450 may be enabled or disabled remotely at a production facility. In one embodiment, the electronics module 450 or video capabilities may be automatically cycled on and off once certain temperatures are reached within the helmet.

Also shown integrated into the strip 402 (or into the back of the helmet) are two antennas 460. In another embodiment, the electronics module 450 as well as the one or more antennas 460 and the indicators 406, 408 are located elsewhere on the body of the athlete (such as clipped to a belt). In this embodiment the electronics module 450 may be connected wirelessly via Bluetooth® or other wireless means to the camera 404 located on the flexible strip 402 which will, in turn, retransmit the video to the network 10, 20, or 30. In one embodiment, the inner surface of the visor or eye shield of the helmet may include one or more eye-tracking sensors configured to capture and transmit eye-tracking data.

In one embodiment of a snowsport helmet, the strip 402 may be attached to the exterior of the helmet 400 by a mounting clip, a VELCRO® brand fastener, adhesive, screws, adjustable connection, or another method.

Figure 5:
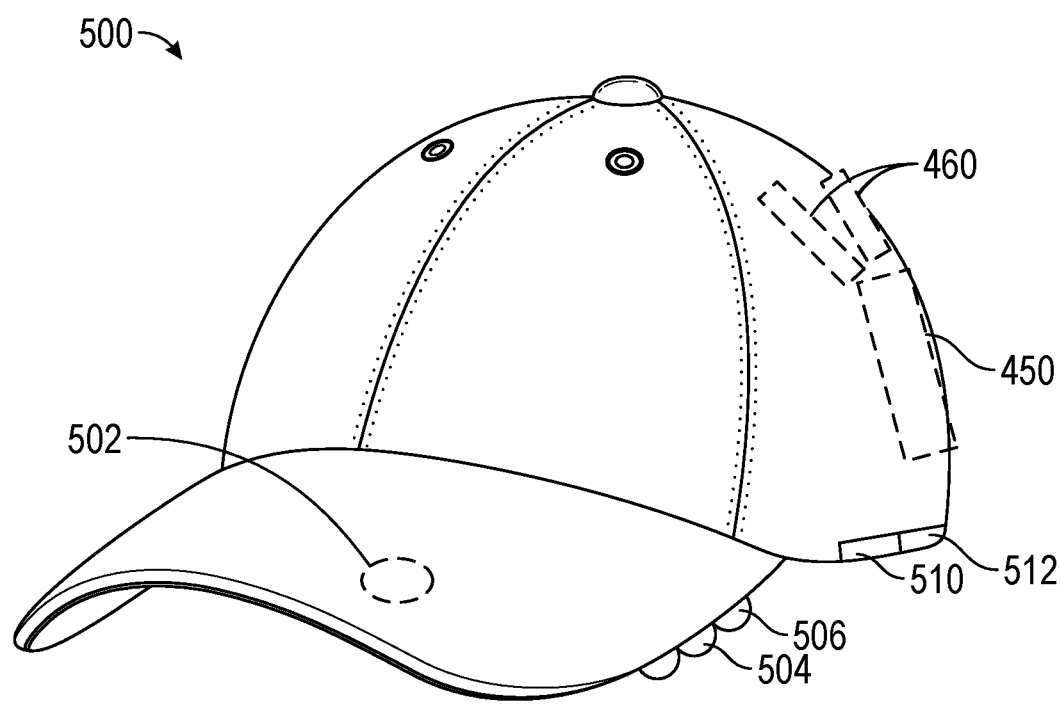
FIG. 5 illustrates a baseball cap with an integrated camera and associated electronics to transmit video content captured by the camera according to one embodiment of the present disclosure.

In one embodiment of the wearable camera apparatus, FIG. 5 illustrates a baseball cap 500 which may be worn by a baseball or softball fielder, or by an athlete in another sport. A baseball player at bat can use a helmet embodiment as disclosed herein. Embodiments that include golf caps and visors or even golf shoes with integrated cameras are also possible. Illustrated in FIG. 5 is a camera 502 attached to the underside of the bill of the baseball fielder cap. The camera is located a sufficient distance from the head so as not to interfere with eyeglasses or sunglasses, or it may be integrated into eye tracking glasses worn by the player. Also shown attached to the cap is a microphone 504 and a small speaker 506 and indicators 510 and 512, which may indicate the status of the network connection as well as the status of the battery. Integrated at the back of the cap is an electronics module 450 as well as one or more antennas 460.

As previously discussed, the electronics module 450, and the indicators 510, 510, and the antennas 460 may be integrated into the cap or, in one embodiment, worn elsewhere on the athlete's body and connected by a wire or wirelessly to the camera 502

FIG. 6 illustrates a simplified block diagram 600 of RF to SDI to conversion according to one embodiment of the present disclosure. Illustrated is a camera 202 which captures and transmits the video data and transmits to an intermediate baseband processor 610. The camera 202 may be connected to the baseband processor 610 via Ethernet, HDMI, universal serial bus (USB), or another interface. The baseband processor 610 such as may be implemented by an ASIC or an FPGA, performs image coding and decoding. The baseband processor 610 then transmits the signal via Low Voltage Differential Signaling (LVDS) or another protocol to transceiver 620 which serves as a transmitter, receiver as well as analog to digital converter. The transceiver 620 can then transmit the signal to a power amplifier 630. The power amplifier 630 sends the amplified signal to the switcher 650 which, in turn, forwards the signal to one or more radio frequency antennas 214 which then transmits using 5G, LTE, CBRS or another RF protocol as is predetermined by the transceiver 620.

When an inbound signal is received from the network, it is first received at the RF antenna 214 of the wearable device, passes through the switcher 650, through the Low-Noise Amplifier (LNA) 640 before it is received by the transceiver 620.

Figure 7:
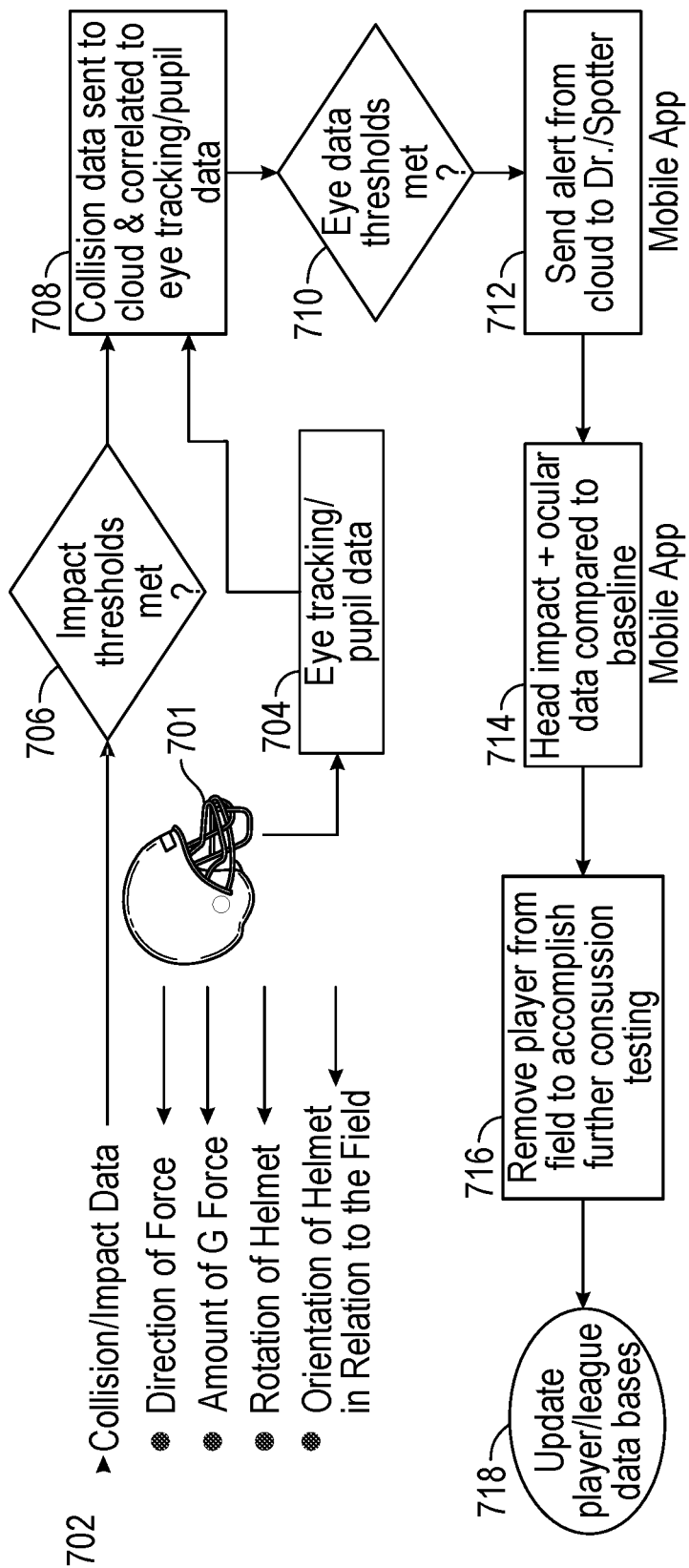
FIG. 7 illustrates a concussion investigation flowchart used in combination with a football helmet, an integrated accelerometer, eye-tracking sensors, and associated electronics of this disclosure.

FIG. 7 illustrates a concussion protocol flow that may be used in combination with the football helmet 701 of this disclosure. As previously disclosed, integrated into the helmet are one or more cameras, an accelerometer, eye-tracking sensors, and associated electronics. In the flowchart of FIG. 7, a football helmet 701 with integrated sensors sustains an impact, e.g., while being worn by a football player. Collision/impact data 702 is collected by the accelerometer, the gyroscope, the magnetometer, and/or other sensors, the collision data including the direction and amount of force, the rotation of the helmet, and the orientation of the helmet in relation to an external landmark such as the field of play. The impact data is compared against one or more predetermined impact thresholds in step 706. The thresholds can include, for example, a value (e.g., an amount of force, an acceleration) or a series of values. In one embodiment, a threshold can be a combination of data from different sensors. If the thresholds are met, then eye-tracking data (e.g., pupil dilation data) is collected from the eye sensors, as shown in step 704, and the eye-tracking data is correlated with the collision/impact data, as indicated in step 708. The correlation can include a synchronization of the eye-tracking data and the collision data. For example, the collision data and the eye-tracking data can be time-stamped or otherwise correlated. Concussion symptoms will present sometime after an impact occurs, with variable timing. Therefore, the synchronization of the eye-tracking data and the collision data can be used to determine the severity of the concussion or a likelihood that the impact is a cause of ophthalmic activity indicative of concussion. In one embodiment, the collision data and the eye-tracking data can be transmitted to a cloud-based device (e.g., cloud-based server) and correlated by the cloud-based device. In one embodiment, the collision data and the eye-tracking data can be analyzed and correlated at a local server in the same physical environment as the football helmet. It can be appreciated that the execution of the concussion protocol flow of FIG. 7 at a local server can reduce latency and delay associated with the transmission of data over a wireless communication protocol to a remote device. The speed of the protocol can be essential to proper analysis and treatment of injury. The steps of the concussion protocol can also be distributed across one or more devices, such as the wearable device (football helmet) and the local server. If a predetermined eye data threshold is met, as determined in step 710, e.g. pupil data indicating an abnormal condition, an alert is sent in step 712 to a mobile application on a device monitored by a physician or other health professional on the sidelines. The alert may be generated by the mobile application. In step 714, the impact data and eye-tracking data are then compared to a predetermined baseline data for the impact or the eye-tracking data. If one or more baselines is exceeded, the local server can transmit an alert to the device monitored by the health professional that the player should be removed from the field as shown in step 716. In step 718, the eye data and the impact data from the incident is uploaded to player or league databases. The concussion protocol flow of FIG. 7 can enhance the data available to health professionals involved in monitoring athletes and can provide more accurate, real-time data if the player resumes play or is no longer being physically monitored by the health professionals, or if the impact was not noticed by others in the first place. Alerts can be generated and displayed in real time on a device that is being monitored by a health professional in order to draw their attention to the collision and the resulting state of the player. The determination of whether the player is exhibiting concussion symptoms based on the sensor data of the wearable device can enable more a more timely and effective response related to the health and safety of the player.

Figure 8:
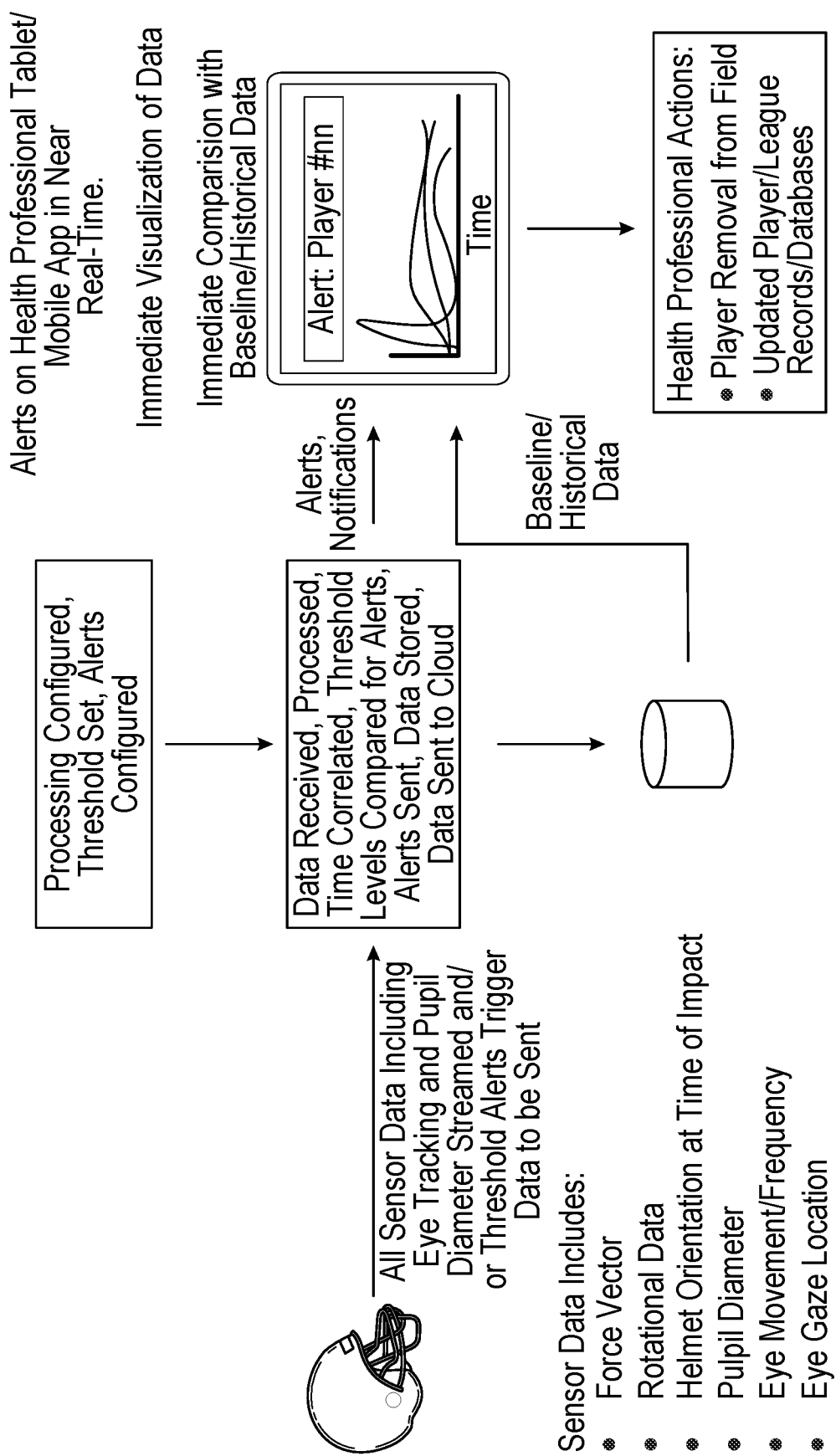
FIG. 8 illustrates a concussion protocol including a visualization of sensor data.

In some embodiments, the collision data and the eye-tracking data can be used to generate a visualization of the player's condition. FIG. 8 is an illustration of a concussion protocol flow with a visualization, according to one embodiment of the present disclosure. In one implementation, the local server can generate the visualization based on sensor data streams received from the football helmet. The sensor data streams can include, for example, a force vectors, rotational data, helmet orientation at a time of impact, pupil diameter, eye movement(s), and eye gaze location. For example, the local server can generate an impact graph indicating the force of a collision and the acceleration, rotation, and/or orientation of the player's head as a result of the collision. The local server can generate a visualization of the player's eye movement based on the eye-tracking data following the collision. The visualization can be, for example, a graph of the direction, angle, variation, movement, differences (e.g., between each eye), and timing of the player's gaze. The visualization of the eye-tracking data can be used to determine if the player is exhibiting unusual optical behavior. Alerts can be triggered and transmitted by the football helmet to the local server or another device when the sensor data exceeds a data threshold. In one embodiment, the local server can access historical data associated with a player. For example, the local server can store or access prior eye-tracking data, including, but not limited to, the player's pupil diameter and eye movement. The historical data can be included in a visualization of present eye-tracking data. The historical data can provide additional context or baseline activity that is specific to each player. The current data can be compared with the historical data to determine if a player was affected by the impact. In some embodiments, the historical data can include collision data. For example, a player may have experienced a number of low-grade impacts with a force that did not exceed a threshold value. The accumulated impacts may still affect the player over time, especially if experienced over a short period of time. Thus, previous collision data and resulting eye-tracking data can provide useful context as to whether a player is likely to be affected by a subsequent impact.

The concussion protocol flow of FIG. 7 is an illustrative example of a data collection and analysis protocol that does not necessarily include video data from a camera attached to a wearable device. For example, a concussion can be assessed using the impact data and the eye-tracking data without the accompanying video data. Additional or alternative workflows utilizing any combination of available data streams can also be compatible with the present disclosure. In one embodiment, a device, such as the wearable device or a local server, can determine which streams of data to collect and/or analyze based on the state of the player and/or recent events, such as a collision.

In one embodiment, as disclosed with respect to the description above, the wearable apparatus includes processing circuitry, such as a CPU. The processing circuitry can also include devices such as an application-specific integrated circuit (ASIC), configurable logic devices (e.g., simple programmable logic devices (SPLDs), complex programmable logic devices (CPLDs), and field programmable gate arrays (FPGAs), and other circuit components that are arranged, such as in FIG. 6, to perform the functions recited in the present disclosure.

The processor CPU can execute one or more sequences of one or more instructions, and the instructions can be read from another computer-readable medium, such as a removable media drive. One or more processors (e.g., CPUs) in a multi-processing arrangement can also be employed to execute the sequences of instructions. In some embodiments, hard-wired circuitry can be used in place of or in combination with software instructions. Thus, the disclosed embodiments are not limited to any specific combination of hardware circuitry and software.

Additionally, the term "computer-readable medium" as used herein refers to any non-transitory medium that participates in providing instructions to the processing circuitry for execution. A computer-readable medium can take many forms, including, but not limited to, non-volatile media or volatile media. Non-volatile media includes, for example, optical, magnetic disks, and magneto-optical disks, or a removable media drive. Volatile media includes dynamic memory.

Numerous modifications and variations are possible in light of the above teachings. It is therefore to be understood that within the scope of the appended claims, the embodiments may be practiced otherwise than as specifically described herein.

Embodiments of the present disclosure may also be as set forth in the following parentheticals.

(1) A wearable apparatus, comprising: a wearable structure; a camera embedded in the wearable structure; one or more eye-tracking sensors embedded in the wearable structure and configured to capture eye-tracking data, wherein the one or more eye-tracking sensors are oriented to face away from the camera along at least one axis; and processing circuitry configured to transmit video data captured by the camera and eye-tracking data over a wireless network.

(2) The wearable apparatus of (1), wherein the one or more eye-tracking sensors include an infrared (IR) sensor.

(3) The wearable apparatus of (1) to (2), wherein the eye-tracking data includes a pupil diameter or a gaze point of a wearer of the wearable structure.

(4) The wearable apparatus of (1) to (3), further comprising one or more motion sensors embedded in the wearable structure and configured to capture motion data, wherein the processing circuitry is further configured to transmit the motion data over the wireless network.

(5) The wearable apparatus of (1) to (4), wherein the one or more motion sensors includes an accelerometer, a gyroscope, or a magnetometer.

(6) The wearable apparatus of (1) to (5), wherein the processing circuitry is further configured to stabilize the video data based on the motion data.

(7) The wearable apparatus of (1) to (6), wherein the processing circuitry is further configured to synchronize the video data with the eye-tracking data and map the eye-tracking data to the stabilized video data based on the motion data.

(8) A method for mapping eye-tracking data to video data, comprising: receiving, via processing circuitry, the video data from a camera embedded in a wearable structure; receiving, via the processing circuitry, the eye-tracking data from one or more eye-tracking sensors embedded in the wearable structure; receiving, via the processing circuitry, motion data from one or more motion sensors embedded in the wearable structure; stabilizing, via the processing circuitry, the video data based on the motion data; mapping the eye-tracking data to the stabilized video data based on the motion data; and transmitting, via the processing circuitry, the video data, the eye-tracking data, and the motion data over a wireless network.

(9) The method of (8), wherein the eye-tracking data includes a gaze point of a wearer of the wearable structure.

(10) The method of (8) to (9), further comprising generating, via the processing circuitry, a visual indicator of the gaze point of the wearer and overlaying the visual indicator on the stabilized video data.

(11) The method of (8) to (10), wherein the gaze point of the wearer is outside of a frame of video data.

(12) The method of (8) to (11), wherein the one or more motion sensors includes an accelerometer, a gyroscope, or a magnetometer.

(13) The method of (8) to (12), further comprising generating, via the processing circuitry, a metadata record of the stabilization of the video data.

(14) A method for assessing a concussion, comprising: receiving, via processing circuitry, impact data from one or more motion sensors; comparing, via the processing circuitry, the impact data to an impact threshold; receiving, via the processing circuitry, eye-tracking data from one or more eye-tracking sensors; comparing, via the processing circuitry, the eye-tracking data to an eye movement threshold; and generating, via the processing circuitry, an alert based on the eye-tracking data and the impact data.

(15) The method of (14), wherein the one or more motion sensors includes an accelerometer, a gyroscope, or a magnetometer.

(16) The method of (14) to (15), wherein the eye-tracking data includes a pupil diameter, an eye movement, or a gaze point.

(17) The method of (14) to (16), further comprising synchronizing, via the processing circuitry, the impact data with the eye-tracking data.

(18) The method of (14) to (17), further comprising generating, via the processing circuitry, a visualization of the impact data and the eye-tracking data over time.

(19) The method of (14) to (18), wherein the eye movement threshold is based on prior eye-tracking data.

(20) The method of (14) to (19), wherein the impact threshold is based on prior impact data.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the embodiments, as well as other claims. The disclosure, including any readily discernible variants of the teachings herein, defines, in part, the scope of the foregoing claim terminology such that no inventive subject matter is dedicated to the public.

The invention claimed is:

1. A wearable apparatus, comprising:
   a sports helmet or a hat;
   sensors and a camera embedded in the sports helmet or the hat;
   one or more infrared eye-tracking sensors attached to a faceguard of the sports helmet or the hat below eyes of a wearer of the sports helmet or the hat at a distance of 4 to 8 inches away from the eyes of the wearer of the sports helmet or the hat and configured to capture eye-tracking data; and
   processing circuitry embedded in the sports helmet or the hat and configured to
      map gaze point locations in a continuous stream of the eye-tracking data to video data captured by the camera by determining a position and a movement of the eyes relative to the one or more infrared eye-tracking sensors when the eyes and the one or more infrared eye-tracking sensors are simultaneously in motion, and determining locations in frames of the video data corresponding to the gaze point locations based on a continuous stream of motion data corresponding to a motion of the one or more infrared eye-tracking sensors attached to the faceguard of the sports helmet or the hat relative to the position and the movement of the eyes of the wearer of the sports helmet or the hat, and
      transmit sensor data captured by the sensors, the video data, and the eye-tracking data over a wireless network,
   wherein the motion of the one or more infrared eye-tracking sensors corresponds to a displacement of the one or more infrared eye-tracking sensors relative to a reference corresponding to the wearer, and
   wherein the motion of the one or more infrared eye-tracking sensors is captured by the one or more infrared eye-tracking sensors.

2. The wearable apparatus of claim 1, wherein the eye-tracking data includes at least one of: a pupil diameter, a rate of change of pupil diameter, a gaze point, and eye movement information of each eye of the wearer of the sports helmet or the hat.

3. The wearable apparatus of claim 1, wherein the sensors embedded in the sports helmet or the hat include one or more motion sensors configured to capture the motion data.

4. The wearable apparatus of claim 3, wherein the processing circuitry is further configured to stabilize the video data captured by the camera based on the motion data corresponding to a motion of the one or more infrared eye-tracking sensors attached to the faceguard of the sports helmet or the hat relative to a position and a movement of the eyes of the wearer of the sports helmet or the hat.

5. The wearable apparatus of claim 4, wherein the processing circuitry is further configured to synchronize the video data with the eye-tracking data and map the eye-tracking data to the stabilized video data based on the motion data.

6. The wearable apparatus of claim 4, wherein the stabilization of the video data includes stabilizing the motion of the sports helmet or the hat relative to a motion of the wearer based on the motion data corresponding to a motion of the one or more infrared eye-tracking sensors attached to the faceguard of the sports helmet or the hat relative to a position and a movement of the eyes of the wearer of the sports helmet or the hat.

7. The wearable apparatus of claim 4, wherein the processing circuitry is further configured to generate a metadata record of the stabilization of the video data and transmit the metadata record of the stabilization over the wireless network.

8. The wearable apparatus of claim 1, wherein the camera is oriented to face away from the one or more infrared eye-tracking sensors along at least one axis.

9. The wearable apparatus of claim 1, wherein the one or more infrared eye-tracking sensors are detachably attached to the faceguard of the sports helmet or the hat.

10. The wearable apparatus of claim 9, wherein the one or more infrared eye-tracking sensors are embedded in an eye shield or a facemask, the eye shield or the facemask being detachably embedded in the sports helmet or the hat via a quickly detachable connector.

11. The wearable apparatus of claim 1, wherein the eye-tracking data includes data related to all or a portion of an eye of the wearer, the portion of the eye including at least one of a pupil, a retina, blood vessels, or an eyelid in concert or separately.

12. The wearable apparatus of claim 1, wherein the processing circuitry is configured to transmit the sensor data captured by the sensors, the video data, and the eye-tracking data over the wireless network as an ultra high-definition transmission of 4K resolution.

13. A method for mapping eye-tracking data to video data, comprising:
   receiving, via processing circuitry, the video data from a camera embedded in a sports helmet or a hat;
   receiving, via the processing circuitry, the eye-tracking data from one or more infrared eye-tracking sensors attached to a faceguard of the sports helmet or the hat below eyes of a wearer of the sports helmet or the hat at a distance of 4 to 8 inches away from the eyes of the wearer of the sports helmet or the hat;
   receiving, via the processing circuitry, motion data corresponding to a motion of the one or more infrared eye-tracking sensors attached to the faceguard of the sports helmet or the hat relative to a position and a movement of the eyes of the wearer of the sports helmet or the hat from one or more motion sensors embedded in the sports helmet or the hat;
   stabilizing, via the processing circuitry, the video data based on the motion data corresponding to the motion of the one or more infrared eye-tracking sensors attached to the faceguard of the sports helmet or the hat relative to the position and the movement of the eyes of the wearer of the sports helmet or the hat; and
   mapping, via the processing circuitry, gaze point locations in a continuous stream of the eye-tracking data to the stabilized video data by determining a position and a movement of the eyes relative to the one or more infrared eye-tracking sensors when the eyes and the one or more infrared eye-tracking sensors are simultaneously in motion, and determining locations in frames of the video data corresponding to the gaze point locations based on a continuous stream of the motion data corresponding to the motion of the one or more infrared eye-tracking sensors attached to the faceguard of the sports helmet or the hat relative to the position and the movement of the eyes of the wearer of the sports helmet or the hat, wherein the motion of the one or more infrared eye-tracking sensors corresponds to a displacement of the one or more infrared eye-tracking sensors relative to a reference corresponding to the wearer, and wherein the motion of the one or more infrared eye-tracking sensors is captured by the one or more infrared eye-tracking sensors.

14. The method of claim 13, wherein the eye-tracking data includes at least one of: a pupil diameter, a gaze point, and eye movement information of the wearer of the sports helmet or the hat.

15. The method of claim 14, wherein the gaze point includes a gaze point in three-dimensional space based on a convergence of the eye movement information.

16. The method of claim 15, wherein the gaze point in three-dimensional space includes a distance from the wearer of the sports helmet or the hat to the gaze point.

17. The method of claim 13, further comprising generating, via the processing circuitry, a visual indicator of the eye-tracking data of the wearer and overlaying the visual indicator on the stabilized video data.

18. The method of claim 17, wherein the eye-tracking data of the wearer includes a gaze point outside of a frame of the stabilized video data.

19. The method of claim 13, further comprising generating, via the processing circuitry, a metadata record of the stabilization of the video data.

20. The method of claim 19, wherein the stabilization of the video data is a first stabilization and the metadata record of the stabilization includes a degree of stabilization of the first stabilization.

21. The method of claim 20, further comprising transmitting the metadata record of the stabilization to a remote device via a wireless network and stabilizing the video data by the remote device after the first stabilization based on the metadata record of the stabilization.

22. The method of claim 13, wherein the stabilization of the video data includes stabilizing the motion of the sports helmet or the hat relative to a motion of a wearer of the sports helmet or the hat based on the motion data.

23. The method of claim 13, further including determining an impact on a wearer of the sports helmet or the hat based on the motion data, comparing impact data to an impact threshold and comparing the eye-tracking data to an eye movement threshold, and generating an assessment of a potential concussion based on the motion data and the eye-tracking data.

24. The method of claim 23, wherein the assessment of the potential concussion is based on prior impact data associated with the wearer.

25. The method of claim 24, wherein the prior impact data associated with the wearer is collected across more than one sports helmet or hat.

26. The method of claim 23, wherein the impact data includes a force vector of the impact on the wearer and a location of the impact on the wearer.

27. The method of claim 23, further comprising generating a visualization of the impact data and the eye-tracking data associated with the impact on the wearer.

28. The method of claim 27, wherein the visualization includes prior impact data associated with the wearer.

29. The method of claim 27, wherein the visualization of the impact data and the eye-tracking data is generated based on data stored in a cloud-based device.

30. The method of claim 23, further comprising generating an alert based on the assessment of the potential concussion.

31. The method of claim 13, wherein the motion data includes an eye movement, a motion of the sports helmet or the hat relative to the eyes of the wearer of the sports helmet or the hat, and a motion of the sports helmet or the hat relative to an environment of the wearer.

32. The method of claim 13, wherein the video data is stabilized based on eye movement data, a motion of the sports helmet or the hat relative to the eyes of the wearer of the sports helmet or the hat, a motion of the sports helmet or the hat relative to an environment of the wearer, and a motion in the video data.

33. A non-transitory computer-readable storage medium for storing computer-readable instructions that, when executed by a computer, cause the computer to perform a method, the method comprising:

receiving video data from a camera embedded in a sports helmet or a hat;

receiving eye-tracking data from one or more infrared eye-tracking sensors attached to a faceguard of the sports helmet or the hat below eyes of a wearer of the sports helmet or the hat at a distance of 4 to 8 inches away from the eyes of the wearer of the sports helmet or the hat;

receiving motion data corresponding to a motion of the one or more infrared eye-tracking sensors attached to the faceguard of the sports helmet or the hat relative to a position and a movement of the eyes of the wearer of the sports helmet or the hat from one or more motion sensors embedded in the sports helmet or the hat;

stabilizing the video data based on the motion data corresponding to the motion of the one or more infrared eye-tracking sensors attached to the faceguard of the sports helmet or the hat relative to the position and the movement of the eyes of the wearer of the sports helmet or the hat; and mapping gaze point locations in a continuous stream of the eye-tracking data to the stabilized video data by determining a position and a movement of the eyes relative to the one or more infrared eye-tracking sensors when the eyes and the one or more infrared eye-tracking sensors are simultaneously in motion, and determining locations in frames of the video data corresponding to the gaze point locations based on a continuous stream of the motion data corresponding to the motion of the one or more infrared eye-tracking sensors attached to the faceguard of the sports helmet or the hat relative to the position and the movement of the eyes of the wearer of the sports helmet or the hat, wherein the motion of the one or more infrared eye-tracking sensors corresponds to a displacement of the one or more infrared eye-tracking sensors relative to a reference corresponding to the wearer, and wherein the motion of the one or more infrared eye-tracking sensors is captured by the one or more infrared eye-tracking sensors.

34. The non-transitory computer-readable storage medium of claim 33, further comprising generating a visual indicator of the eye-tracking data of the wearer of the sports helmet or the hat and overlaying the visual indicator on the stabilized video data.

* * * * *